United States Patent [19]

Cooke et al.

[11] 4,219,635
[45] Aug. 26, 1980

[54] PROCESS FOR POLY (BISPHENOL A/TEREPHTHALATE/CARBONATE) USING PYRIDINE REACTION MEDIUM

[75] Inventors: Robert S. Cooke, Morris Plains, N.J.; Josefina T. Baker, Sunnydale, Calif.; Stylianos Sifniades, Madison, N.J.

[73] Assignee: Allied Chemical Corporation, Morris Township, Morris County, N.J.

[21] Appl. No.: 6,819

[22] Filed: Jan. 26, 1979

[51] Int. Cl.$^2$ ............................................. C08G 63/64
[52] U.S. Cl. ..................................... 528/182; 525/418; 525/462; 525/466; 528/194; 528/196; 528/199; 528/371
[58] Field of Search ............... 528/182, 199, 371, 194, 528/196; 260/860; 525/418, 462, 466

[56] References Cited

U.S. PATENT DOCUMENTS 3,220,976  11/1965  Goldberg ........................... 528/182

Primary Examiner—Lester L. Lee
Attorney, Agent, or Firm—Robert A. Harman

[57] ABSTRACT

Poly(ester/carbonates) are produced by adding phosgene to a reaction mixture of bisphenol A and terephthalic acid as ester-forming reactants, at mole ratios in the range between 2.0:0.8 and 2.0:1.3, in which the reaction medium consists essentially of pyridine, the concentration of bisphenol A plus terephthalic acid is in the range between 5 and 50 grams per 100 ml of pyridine; and the phosgene is added under agitation at a rate of at least 0.07 gm-mmole/liter.sec. The process is carried out at temperature in the range between 50° C. and 115° C. and not below the temperature given by the Arrhenius equation:

$$\ln U = 10 - 12/0.001987\ T$$

where U is phosgene feed rate in gram-moles/liter.second and T is absolute temperature of the reaction mixture (degrees Kelvin). Preferred phosgene feed rates are at least 0.13 gram-millimoles/liter.second; and preferred temperatures of the reaction mixture are between 60° C. and 80° C.

2 Claims, No Drawings

PROCESS FOR POLY (BISPHENOL A/TEREPHTHALATE/CARBONATE) USING PYRIDINE REACTION MEDIUM

BACKGROUND OF THE INVENTION

This invention relates to production of poly(ester/carbonates) from bisphenol A ("BPA") and terephthalic acid ("TPA") using essentially only pyridine as the reaction medium.

It has been proposed in U.S. Pat. No. 3,030,331 of Apr. 17, 1962 and 3,169,121 of Feb. 9, 1965 both to E. P. Goldberg to produce poly(ester/carbonates) by adding phosgene to a pyridine solution of bisphenol A and terephthalic acid. It has been found however, that at least when the ratio of bisphenol A:terephthalic acid is in the range between about 2.0:0.8 and 2.0:1.3, the conditions of Goldberg's examples result in polymers which are deficient in terephthalic ester moiety and which are hazy or opaque and have low strength and toughness (U.S. application Ser. No. 764,623 of Prevorsek et al. filed Feb. 1, 1977; published as West German DOS 2,714,544 of Oct. 2, 1977). Such defects are confirmed in Table 1 below, by the results obtained at temperature of 30° C. (Goldberg's temperature condition.)

SUMMARY OF THE INVENTION

In accordance with the present invention, conditions have been found whereby the above reactants in the above proportions can be converted to poly(ester/carbonate) of good properties using pyridine as the sole reaction medium. These conditions include adding phosgene to a reaction mixture of bisphenol A and terephthalic acid in a reaction medium consisting essentially of pyridine, at mole ratios in the range between 2.0:0.8 and 2.0:1.3 of bisphenol A:terephthalic acid, with the phosgene reactant being added under good agitation at a rate of at least 0.07 gram-millimoles/liter.-second. Concentration of the bisphenol A plus terephthalic acid is generally in the range between about 5 and about 50 grams per 100 ml of pyridine.

In particular the conditions now found to be successful involve maintaining such solution in said reaction medium at temperature in the range between 50° C. and 115° C. and not below the temperature given by the relation with phosgene feed rate:

$$\ln U = C - E/RT,$$

wherein U is phosgene feed rate in gram-moles/liter.-second, C is a proportionality constant (approximately 10), E (approximately 12 kilocalories/gram-mole) is the activation energy in the Arrhenius equation for the specific second order rate constant of the reaction of bisphenol A with terephthalic anhydride, R (equals 0.001987) is the gas constant in units of kilocalories/gram-mole.degree absolute, and T is the absolute temperature of the reaction mixture.

PREFERRED EMBODIMENTS

From the table below it will be seen that especially good results are obtained at temperatures in the range between 60° C. and 80° C. using phosgene feed rates of at least 0.13 gram-millimoles/liter.second.

Procedure

The procedure for the runs presented in the table was essentially as follows, referring specifically to Run 14:

A 1000-ml flask fitted with a thermometer, mechanical stirrer, gas inlet tube and solid $CO_2$ condenser attached to a caustic scrubber was charged with 14.1 g (85 mmol) of terephthalic acid ("TRA"), 38.8 g (170 mmol) bisphenol A ("BPA"), 0.9 g (6 mmol) t-butylphenol (molecular weight regulator) and 470 ml pyridine. A 26.8 g (270 mmol) portion of phosgene was bubbled into the reaction mixture over approximately 2 hours (0.212 g/min.=0.070 mmol/L. sec.) while maintaining a temperature of 50° C. and a stirring rate of 600 rpm. Stirring was then continued at ambient temperature for approximately one more hour, and excess phosgene was then destroyed by careful addition of 50 ml methanol.

Precipitation of the polymer was carried out in a stainless steel blender by addition of the reaction mixture over 15–20 minutes to 2000 ml isopropanol. The solids were filtered and washed in the blender with three 1000-ml portions of isopropanol. The polymer was dried in vacuo at 110°–130° C. overnight to yield 51.9 g (97.8% of theory) of poly(ester/carbonate).

In certain instances noted in Table 1 below, material obtained in the fashion described above was subjected to further purification. A 250-ml portion of water was added to 50–53 g poly(ester/carbonate) dissolved in 500 ml dichloromethane. The resulting heterogeneous mixture was emulsified in a flask equipped with a stopcock drain and a mechanical stirrer operating at approximately 700 rpm. Precipitation was carried out in a stainless steel blender by addition of the emulsion over 15–20 minutes to 2000 ml isopropanol which was initially heated to 60–65° C. and rapidly stirred. The solids were filtered and washed in the blender sequentially with 1000-ml portions each of isopropanol, water initially heated to 90°–100° C. and isopropanol. The polymer was then redissolved in 500 ml dischloromethane, filtered under vacuum through a medium glass frit, precipitated and washed as above. The purified poly(ester/carbonate) was dried in vacuo at 130–140° C. overnight.

Table 1.

Reaction Conditions and Analytical Data for Poly(ester-carbonate) Preparations

| Run No. | t, °C. | Phosgene feed rate g min$^{-1}$ | Phosgene feed rate mmol L$^{-1}$sec$^{-1}$ | % yield | TPA incorporation infrared (moles per 2 moles BPA) | TPA incorporation nmr | $n_{sp}/c$, dL g$^{-1}$ | $T_g$, °C. | Haze (ASTM D1003) |
|---|---|---|---|---|---|---|---|---|---|
| 1 | 30 | 0.188 | 0.062 | 97.8 | 0.91 | 0.81 | 0.68 | 173 | 102.1 |
| 2$^a$ | 30 | 0.205 | 0.067 | 97.0 | 0.89 | 0.79 | 0.65 | — | — |
| 3$^b$ | 30 | 0.212 | 0.070 | 69.4 | 0.69$^c$ | 0.62 | 0.20 | — | — |
| 4 | 30 | 0.361 | 0.119 | 95.2 | 0.63$^c$ | 0.61 | 0.52 | 153 | — |
| 5 | 30 | 0.536 | 0.176 | 96.6 | 0.53$^c$ | 0.55 | 0.48 | — | — |
| 6 | 30 | 0.785 | 0.258 | 98.8 | 0.41$^c$ | 0.45 | 0.47 | — | — |
| 7$^d$ | 30 | 0.209 | 0.406 | 86.5 | 0.43$^c$ | 0.45 | 0.31 | 137 | — |
| 8 | 40 | 0.075 | 0.025 | 96.7 | 0.97 | 0.97 | 0.64 | 179 | 107.0 |
| 9 | 40 | 0.264 | 0.087 | 95.6 | 0.93 | 0.85 | 0.68 | — | 65.7 |

Table 1.-continued
Reaction Conditions and Analytical Data for Poly(ester-carbonate) Preparations

| Run No. | t, °C. | Phosgene feed rate g min$^{-1}$ | Phosgene feed rate mmol L$^{-1}$sec$^{-1}$ | % yield | TPA incorporation infrared (moles per 2 moles BPA) | TPA incorporation nmr | $n_{sp}/c$, dL g$^{-1}$ | $T_g$, °C. | Haze (ASTM D1003) |
|---|---|---|---|---|---|---|---|---|---|
| 10[e] | 50 | 0.194 | 0.054 | 96.9 | 1.08 | 0.96 | 0.68 | 176 | 104.0 |
| 11 | 50 | 0.362 | 0.119 | 96.3 | 1.00 | 0.95 | 0.68 | — | 25.0 |
| 12[f] | 50 | 0.416 | 0.058 | 90.5[g] | 1.00[g] | 1.02 | 0.85 | 182[g] | 48.8[g] |
| 13[e] | 50 | 0.211 | 0.059 | 97.0 | 1.05 | 0.95 | 0.69 | 179 | 99.0 |
| 14 | 50 | 0.212 | 0.070 | 97.8 | 0.95 | 1.02 | 0.78 | 182 | 6.8 |
| 15 | 50 | 0.576 | 0.189 | 96.2 | 0.93 | 0.89 | 0.63 | 173 | 36.9 |
| 16 | 50 | 0.818 | 0.269 | 96.0 | 0.88 | 0.78 | 0.65 | 172 | 98.7 |
| 17 | 60 | 0.407 | 0.133 | 97.4 | 1.06 | 0.97 | 0.72 | 180 | 2.4 |
| 18[f] | 60 | 0.963 | 0.134 | 89.4[g] | 1.06[g] | 1.04[g] | 0.72[g] | 180[g] | 2.0[g] |
| 19 | 60 | 0.413 | 0.136 | 90.6[g] | 1.02 | 0.96 | 0.74 | 181 | 1.8 |
| 20 | 60 | 0.758 | 0.249 | 97.0 | 1.00 | 0.91 | 0.76 | 178 | 84.6 |
| 21 | 60 | 1.119 | 0.368 | 96.7 | 0.91 | 0.90 | 0.63 | 167 | 59.0 |
| 22 | 70 | 0.759 | 0.249 | 97.8 | 1.01 | 1.00 | 0.70 | 178 | 1.8 |
| 23 | 71 | 1.161 | 0.381 | 97.8 | 0.93 | 1.03 | 0.73 | 177 | 7.0 |
| 24 | 80 | 0.518 | 0.170 | 97.4 | 1.05 | 1.03 | 0.64 | 176 | 0.8 |
| 25 | 80 | 0.901 | 0.296 | 97.4 | 1.05 | 1.05 | 0.68 | 178 | 1.2 |
| 26 | 80 | 1.231 | 0.404 | 97.9 | 1.03 | 1.04 | 0.66 | 177 | 1.2 |

[a]Liquid phosgene was added dropwise through a dry ice condenser.
[b]Stirring rate was reduced to 100 rpm.
[c]Anhydride contamination was detectable in the infrared analysis.
[d]Reactor charge was a 3.32 g (20.0 mmol) terephthalic acid, 9.13 g (40.0 mmol) bisphenol A 0.21 g (1.4 mmol) t-butylphenol in 76.6 ml pyridine.
[e]Experiment was performed at 1.18 times normal scale.
[f]Experiment was performed at 2.35 times normal scale.
[g]Values were determined after the normal isolation procedure followed by two reprecipitations as above described.

Analytical Methods

Composition was determined independently by $^1$H magnetic resonance and infrared spectroscopic methods. In addition, transmission haze measurements on dilute solutions provided an assessment of solubility.

Ideally poly(ester/carbonate) prepared by direct condensation of terephthalic acid, bisphenol A and phosgene is composed of the two repeating units shown below.

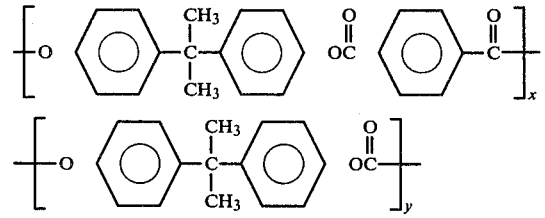

The subscripts x and y represent respectively the number of BPA/TPA ester and number of BPA/carbonate equivalents in the resulting copolymer.

The $^1$H magnetic resonance method measures composition as a mole ratio, equal to the ratio between the integrated areas due to terephthalate ring protons ($\delta 8.30$) and bisphenol A ring protons ($\delta 7.20$):

(terephthalate/bisphenol A) $_{NMR} = x/(x+y)$

The analyses were performed on 5.0% (w/w) polymer solutions in chloroform-d assuming equal response factors for the two types of protons measured, that is, the method was not calibrated.

Determination of composition by the infrared method involves measurement of the absorbance ratio for bands attributed to the carbonyl groups in respectively the carboxylic ester linkages (1740 cm$^{-1}$) and the carbonate linkages (1775 cm$^{-1}$). Since each "x" unit in the above formula contains two carboxylic ester carbonyl groups and each "y" unit contains one carbonate carbonyl group, it follows that: (carbonate/ester)$_{IR}$ = y/2x. Hence (terephthalate/bisphenol A)$_{IR}$ = x/(x+y) = 1/[1+2(carbonate/ester)$_{IR}$]

The analyses were performed on thin films cast from dichloromethane solution. A calibration curve was determined with known mixtures of pure poly(bisphenol A/carbonate) and poly(bisphenol A/terephthalate).

If the direct condensation of terephthalic acid, bisphenol A and phosgene proceeds to completion and produces only ester and carbonate repeating units, the poly(ester/carbonate) product must have a bisphenol A:terephthalate mole ratio identical to the ratio of corresponding reagents charged. Precipitation of the copolymer will remove low molecular weight ends; however, significant fractionation according to composition is not expected. In the event, material isolated in many of the experiments of Table 1 exhibited TPA:BPA mole ratios substantially less than the ratio of corresponding reagents charged. Such deficiency in terephthalate ester units may be accounted for by occurrence of the anhydride linkages shown below as intrusions in the poly(ester/carbonate) polymer or as the repeating unit in a poly(terephthalic anhydride) fraction:

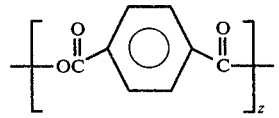

The solubility of poly(ester/carbonate) preparations was assessed by measurement of transmission haze values for 0.50% (w/v) copolymer solutions in dichloromethane. All samples in which inefficient incorporation of terephthalate ester linkages was observed also contained a portion of insoluble material. The characterization and quantitative determination of the insoluble fraction in copolymer from experimental Run 1 was carried out as follows:

A 0.5001 g sample of poly(ester/carbonate) in 50 ml dichloromethane was stirred for approximately 45 minutes at room temperature. The mixture was forced under nitrogen pressure through a 5 μm poly(tetrafluoroethylene) filter, and a clear filtrate was obtained. The filter cake was washed with three 10-ml portions of dichloromethane and dried in vacuo at 65° C. for several minutes to give 0.0205 g of hard, granular residue. In a series of determinations the insoluble portion comprised 3.9±0.2% (w/w) of the polymer preparation. A slurry of material scraped from the filter was prepared in warm tetrachloroethane, layered on a potassium chloride plate and allowed to dry. The infrared spectrum exhibited strong absorptions at 1725 and 1790 cm$^{-1}$ and a weak shoulder at 1695 cm$^{-1}$ presumably due to carboxylic acid end groups. The insoluble fraction was identified as poly(terephthalic anhydride) containing few, if any, carbonate or ester linkages. Depending on the degree of polymerization, this material accounts for 15–17% of the terephthalic acid charge. Since the measurements of composition indicate 81–91% incorporation as carboxylic ester linkages, an acceptable terephthalic acid mass balance is obtained for this preparation.

A small fraction of the terephthalic acid which is not incorporated as ester linkages may form anhydride intrusions in the poly(ester/carbonate) polymer. However, the foregoing results demonstrate that the bulk of this material can be accounted for in a poly(terephthalic anhydride) fraction which is responsible for the haziness of chloroform and dichloromethane solutions.

Composition analyses for the poly(ester/carbonate) produced in Runs 8, 10, 12, 13 (using phosgene feed rates less than 0.07 mmol/L.sec.) indicate nearly complete incorporation of terephthalic acid as carboxylic ester linkages. However, the preparations exhibited anomalously high transmission haze values. Visual inspection indicated that the nature of the insoluble material was quite different from the poly(terephthalic anhydride) described above. The characterization and quantitative determination of the insoluble portion in polymer from experimental Run 10 was carried out as follows.

0.4989 g sample of poly(ester/carbonate) in 50 ml dichloromethane ("DCM") was stirred for approximately 45 minutes at room temperature. The mixture was filtered, washed and dried as outlined above to give 0.0223 g of hard flakes. In a series of determinations the insoluble portion comprised 4.3±0.1% (w/w) of the polymer preparation. Such material insoluble in DCM was scraped from the filter and dissolved in warm tetrachloromethane; layered on a potassium chloride plate; and allowed to dry. The infrared spectrum exhibited absorptions at 1740 and 1775 cm$^{-1}$, as for poly(ester/carbonate), and gave no indication of anhydride contamination. This DCM-insoluble fraction was identified as poly(ester/carbonate) with a (carbonate/ester)$_{IR}$ ratio of 0.14, which corresponds to approximately 30% of the theoretical value of 0.50 found to be approximated in soluble polymer. Apparently, when phosgene feed rates are too slow, DCM-insoluble material precipitates, and the resulting solid precipitate undergoes further condensation-polymerization with phosgene very slowly.

Phosgene Feed Rate—Reaction Temperature Relationship

We theorize that the mechanism for the subject condensation-polymerization involves nucleophilic attack of bisphenol A ("BPA") on terephthalic anhydride, formed by interaction of terephthalic acid and phosgene. BPA terephthalate is thereby formed. A parallel and undesirable pathway results in the conversion of the anhydride to poly(terephthalic anhydride). If the reaction conditions are otherwise fixed, the relative amount of poly(terephthalic anhydride) in the poly(ester/carbonate) polymer will be determined by the ratio k/U, where U is the rate of phosgene introduction in units ofmol/L.sec, and k is the specific second order rate constant for the desired phenolysis reaction with units of L/mol.sec.

This theoretical prediction may be reduced to the following linear relation between the phosgene feed rate and the reaction temperature, for a given level of anhydride contamination (where k has been written in Arrhenius form, and "moles" for units refers to gram-moles):

$$\ln U = C - E/RT.$$

The variable U is phosgene feed rate in units of mol/L.sec; E is an activation energy in kcal/mole; R is the gas constant (0.001987) in kcal/mole, per degree absolute; T is absolute temperature (K°) and C is a constant which is set by the chosen level of anhydride contamination to be found in the poly(ester/carbonate) preparations. The activation energy, E, and a suitable value for C can be determined by performing a series of polymerizations at various temperatures and rates of phosgene introduction; and selecting points on the boundary curve betwen satisfactory and unsatisfactory products. Three suitable criteria for such selection are that (1) the product incorporate at least 95% of the terephthalic acid charge as carboxylic ester linkages, as determined by infrared spectroscopy; and (2) as determined by nuclear magnetic resonance measurements; and that it (3) exhibit transmission haze values below 10. Process conditions giving rise to product deficient in only one of these specifications are considered to be of marginal value for the purpose of this invention.

Such boundary points seleced from the above Table 1 are those points representing the reaction conditions of Runs 11 and 23. The straight line joining the points (ln U$_{11}$, 1/T$_{11}$) and ln U$_{23}$, 1/T$_{23}$) designates the upper boundary of the acceptable domain and is defined by the parameters E=12.2 kcal/mol and C=10.0 for U in units of mol/L.sec. The lower boundary of this domain is the line parallel to the (1/T) axis and passing through the value U=0.07 for phosgene feed rate in mmol/L. sec. At lower rates of phosgene introduction the reaction times are excessively long, and precipitation of poly(ester/carbonate) oligomers characterized by a low carbonate to ester ratio is observed. These two boundaries limit the polymerization conditions to temperatures not below 50° C. and feed rates not below 0.07 mmol/L. sec.; increasing feed rate requires increasing temperature.

As just noted, the direct condensation of terephthalic acid, bisphenol A and phosgene can be performed satisfactorily only at temperatures not below 50° C. Under these conditions the color of the reaction mixture undergoes a dramatic change near the point at which the stoichiometric amount of phosgene has been charged. The initially colorless slurry turns yellow and then deep emerald. In the first precipitation and washings the filtrates have a distinct green tint; however, at the end of the purification process, which involves two additional cycles, the filtrates are colorless. Notwithstanding, compression molded samples of poly(ester/carbonate) prepared by this process exhibit a marked yellow or amber color.

Table 2 presents the yellowness index and transmission haze data for plaques molded from preparations of acceptable copolymer. All were purified by three precipitation and washing cycles as previously described.
Table 2. Optical Properties of Poly(ester/carbonate) Copolymer Table 2.

Optical Properties of Poly(ester/carbonate) Copolymer

| Run No. | Temp. of Run | Molding Conditions | | | Yellowness index | Haze |
|---|---|---|---|---|---|---|
| | | Thickness (inch) | (mm) | Temp. (°C.) | | |
| 24 | 80° | 0.110 | 2.79 | 250 | 58.2 | 4.5 |
| 24$^a$ | 80° | 0.110 | 2.79 | 250 | 21.4 | 20.0 |
| 19 | 60° | 0.140 | 3.56 | 250 | 33.0 | 5.5 |
| | | 0.120 | 3.05 | 315 | 56.7 | 5.1 |
| (17/22)$^b$ | 60°/70° | 0.132 | 3.35 | 315 | 124.1 | 2.5 |
| 18 | 60° | 0.133 | 3.38 | 315 | 148.0 | 8.4 |

$^a$Sample was treated with decolorizing carbon as described at Note (a) below.
$^b$Composite sample was prepared by dissolving approximately equal amounts of material from the above Runs 17 and 22 in dichloromethane, and reprecipitating the mixture.

Note (a) The following experiment was undertaken to determine if adsorbents were effective in reducing the color of compression molded materials. A 22.8 g portion of copolymer produced in Run 24 was dissolved in 300 ml dichloromethane and stirred with 0.46 g decolorizing carbon (Baker & Adamson). The slurry was filtered through a 2.5×8.0 cm plug of Celite ® under nitrogen pressure. The procedure was repeated, and the copolymer was precipitated in 2000 ml of hot isopropanol, washed with 1000 ml of isopropanol and dried in vacuo at 140° C. overnight to give 19.2 g of recovered material. The yellowness index of a compression molded sample decreased dramatically; however, the haze value was increased. Presumably the increased transmission haze resulted from inadequate removal of material used in the filtering process.

Mechanical testing was performed on two preparations of poly(ester/carbonate) after compression molding at 315° C. The results presented in Table 3 show some sample-to-sample variations which evidently result from uncontrolled variables in the preparation, purification or molding of the materials.

Both samples show a measurable reduction in the solution viscosity after a normal molding cycle at 315° C. This degradation corresponds to an 8–9% decrease in the number average molecular weight. It is reasonable to assume that the somewhat reduced values of Izod impact strength and tensile modulus (compared to results disclosed in the above cited U.S. application Ser. No. 764,623) result, at least in part, from this decomposition. Other mechanical properties are similar to those recorded in that application.

Table 3.

Mechanical Properties of Poly(ester-carbonate) Copolymers

| property, units | | |
|---|---|---|
| viscosity, dl/g | | |
| before molding | 0.71 | 0.72 |
| after molding | 0.66 | 0.66 |
| heat distortion temp., °C. | 165 | 163 |
| ASTM D648 at 264 psi (182N/cm$^2$) | | |
| Izod impact strength, ASTM D256, "A" ft-lb/in; m.N/cm of notch | 3.8;2.03 | 3.9; 2.08 |
| tensile modulus, lb/in.$^2$; N/cm$^2$ | 290,000; 200,000 | 330,000; 228,000 |
| yield elongation, % | 13.0 | 12.7 |
| yield strength, lb/in$^2$; N/cm$^2$ | 9230; 6364 | 9210; 6350 |
| ultimate elongation, % | 66 | 22 |
| ultimate tensile strength, lb/in$^2$; N/cm$^2$ | 9100; 6274 | 8500; 5861 |

We claim:
1. In a process for production of poly(ester/carbonate) by adding phosgene to a reaction mixture of bisphenol A ie. 2,2-bis-(4-hydroxyphenyl)propane) and terephthalic acid wherein the bisphenol A and terephthalic acid are at mole ratios in the range between 2.0:0.8 and 2.0:1.3; the reaction medium consists essentially of pyridine; the concentration of the bisphenol A plus terephthalic acid is in the range between about 5 and about 50 grams/100 milliliters of pyridine; and the phosgene reactant is added to said reaction mixture under agitation, at a rate of at least 0.07 gram-millimole/liter.-second: the improvement which comprises maintaining said reaction mixture at temperature in the range between 50° C. and 115° C. and not below the temperature given by the relation with phosgene feed rate:

$$\ln U = C - E/RT,$$

where U is phosgene feed rate in gram-moles/liter.-second, C is a constant=10, E=12 kilocalories/mole is the activation energy in the Arrhenius equation for the specific second order rate constant of the reaction of bisphenol A with terephthalic anhydride, and R=0.001987 is the gas constant in units of kilocalories/gram-mole·degree Kelvin.

2. Process of claim 1 wherein temperature is in the range between about 60° C. and about 80° C. and phosgene feed rate is at least 0.13 gram-millimole/liter.-second.

* * * * *